United States Patent [19]
Mainard

[11] Patent Number: 5,519,916
[45] Date of Patent: May 28, 1996

[54] CART WHEEL AND BRAKE ASSEMBLY

[75] Inventor: Tommy D. Mainard, Wagoner, Okla.

[73] Assignee: UNR Industries, Inc., Chicago, Ill.

[21] Appl. No.: 404,194

[22] Filed: Mar. 13, 1995

[51] Int. Cl.⁶ .................................................. B65B 5/04
[52] U.S. Cl. ............................ 16/35 R; 188/31; 188/69
[58] Field of Search ...................... 16/35 R; 280/33.994; 188/1.12, 19, 31, 69

[56] References Cited

U.S. PATENT DOCUMENTS

| | | | |
|---|---|---|---|
| 918,636 | 4/1909 | Young | 16/35 R |
| 1,137,329 | 4/1915 | Johnson | 16/35 R |
| 3,239,873 | 3/1966 | Fisher | 188/1.12 |
| 4,840,388 | 6/1989 | Doughty | 280/33.994 |

FOREIGN PATENT DOCUMENTS 2146277  3/1973  Germany .................... 16/35 R

OTHER PUBLICATIONS

Ephtec, Inc., one-page advertisement comprising three photographs for "Universal Bascart Parking brake", undated.
Rotary Brake Int'l Inc., one-page advertisement comprising two photographs for Cart Stop Brake, undated.

*Primary Examiner*—M. Rachuba
*Assistant Examiner*—Christopher Kirkman
*Attorney, Agent, or Firm*—Dressler, Goldsmith, Shore & Milnamow, Ltd.

[57]  ABSTRACT

In a wheel and brake assembly for a wheeled cart, such as a shopping cart or a luggage cart, a horn is mountable to the cart so as to extend downwardly from the cart. A wheel defining a wheel axis and including a hub is journalled to the horn at the hub. A pin projects from the hub but clears the horn when the wheel is rotated. A bracket is mounted pivotably to the horn so as to be pivotable over a limited range, between an inoperative position and an operative position, with a tang projecting axially from the bracket. The tang is arranged to engage the pin so as to brake the wheel against further rotation in one rotational sense, once the bracket has been pivoted to the operative position, if the wheel is rotated by less than one full revolution in the same rotational sense. The pin is arranged to engage the tang so as to pivot the bracket from the operative position, and so as to release the wheel, if the wheel is rotated by less than one full revolution in the opposite rotational sense.

10 Claims, 1 Drawing Sheet 5,519,916

CART WHEEL AND BRAKE ASSEMBLY

TECHNICAL FIELD OF THE INVENTION

This invention pertains to a wheel and brake assembly providing a one-way braking action, for a wheeled cart, such as a shopping cart or a luggage cart.

BACKGROUND OF THE INVENTION

Typically, shopping carts and luggage carts have front wheels mounted on swivel casters and back wheels mounted on fixed journals. When such a cart is brought to a resting position on a downwardly sloping surface, the cart tends to roll downwardly, unless the cart is held back by a user or one or more of its wheels are braked.

It has been known to provide such a cart with a brake arranged to act on one of the back wheels of the cart so as to prevent the cart from rolling forwardly or backwardly. It can be sometimes difficult for a rushed user to release the braked wheel, particularly under crowded conditions in a retail store, in a parking lot, or in an airport, railway station, or other transportation terminal.

SUMMARY OF THE INVENTION

This invention provides a wheel and brake assembly providing a one-way braking action, for a wheeled cart, such as a shopping cart or a luggage cart. Broadly, the wheel and brake assembly includes a horn, a wheel including a hub and being journalled to the horn at the hub, and means for braking the wheel against further rotation in one rotational sense if the wheel is rotated by less than one full revolution in the same rotational sense and for releasing the wheel if the wheel is rotated by less than one full revolution in the opposite rotational sense.

In one contemplated embodiment, in which the horn is mountable to the cart so as to extend downwardly from the cart, a pin projects from the hub but clears the horn when the wheel is rotated. Moreover, a bracket is mounted pivotably to the horn so as to be pivotable over a limited range, between an inoperative position and an operative position, and a tang projects axially from the bracket. The tang is arranged to engage the pin so as to brake the wheel against further rotation in one rotational sense, once the bracket has been pivoted to the operative position, if the wheel is rotated by less than one full revolution in the same rotational sense. The pin is arranged to engage the tang so as to pivot the bracket from the operative position, and so as to release the wheel, if the wheel is rotated by less than one full revolution in the opposite rotational sense.

Preferably, the bracket is mounted pivotably to the horn so as to be pivotable about a pivot axis parallel to the wheel axis and spaced by a comparatively shorter distance from the wheel axis, and the pin is spaced by a comparatively longer distance from the wheel axis. The tang may be then arranged to pass between the pivot axis and the pin, once the bracket has been pivoted to the inoperative position, if the wheel is rotated in either rotational sense.

Preferably, moreover, the bracket is arranged to be upwardly pivotable to the operative position and to be downwardly pivotable to the inoperative position. The tang may be then arranged to engage the horn at an upper location on the horn so as to limit pivoting of the bracket to the operative position and to engage the horn at a lower location on the horn so as to limit pivoting of the bracket the inoperative position.

Although this invention is intended to be particularly useful for shopping carts and luggage carts, this invention may prove to be additionally useful for tool carts, stock carts, hospital carts, and other wheeled carts of diverse types.

These and other objects, features, and advantages of this invention are evident from the following description of a preferred embodiment of this invention with reference to the accompanying drawings.

DETAILED DESCRIPTION OF THE PREFERRED EMBODIMENT

Figure 1:
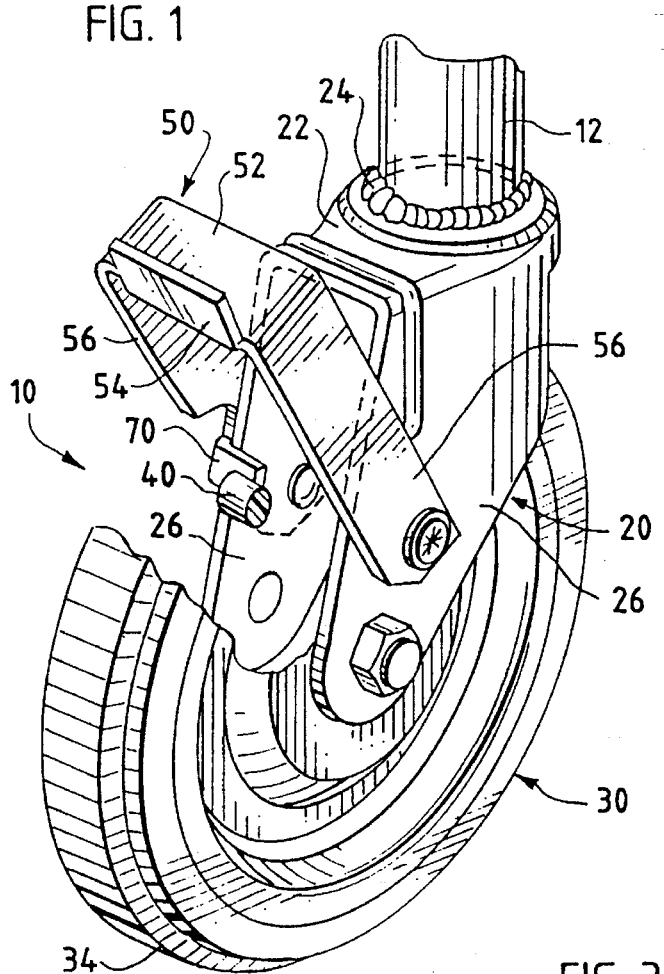
FIG. 1 is a partly broken away, perspective view of a wheel and brake assembly constituting a preferred embodiment of this invention and being mounted to a wheeled cart, such as a shopping cart or a luggage cart.

As shown in FIG. 1, a wheel and brake assembly 10 constituting a preferred embodiment of this invention is mounted to a wheeled cart, such as a shopping cart or a luggage cart. Only a lower end 12 of a tubular element of a chassis of the wheeled cart is shown. The heel and brake assembly 10 provides the wheeled cart with a one-way braking action.

The wheel and brake assembly 10 includes a steel horn 20, which has a cross portion 22 mounted to the element end 12 via welding 24, and which has two lateral portions 26 extending downwardly from the cross portion 22. The wheel and brake assembly 10 also includes a wheel 30 including a polymeric hub 32 and a polymeric rim 34 and defining a wheel axis. At the hub 32, the wheel 30 is journalled to the horn 20, between the lateral portions 26 of the horn 20, via a center bolt 36. Except as shown and described herein, the horn 20 is similar to known horns, and the wheel 30 is similar to the wheel disclosed in Hicks U.S. Pat. No. 5,275,473, the disclosure of which is incorporated herein by reference.

According to this invention, the wheel and brake assembly 10 includes means for braking the wheel against further rotation in one rotational sense if the wheel is rotated by less than one full revolution in the same rotational sense and for releasing the wheel if the wheel is rotated by less than one full revolution in the opposite rotational sense.

Thus, a steel pin 40 projects axially from one side of the hub 32, to which the pin 40 is attached rigidly. The pin 40 does not project so far as to interfere with the horn 20, at whichever of the lateral portions 26 of the horn 20 is nearer, but clears the horn 20 when the wheel 30 is rotated.

Also, a bracket 50 is mounted pivotably to the horn 20 so as to be pivotable about a pivot axis parallel to the wheel axis, the pivot axis being spaced by a comparatively shorter distance from the wheel axis and the pin 40 being spaced by a comparatively longer distance from the wheel axis. The bracket 50 has a cross portion 52, from which a flange 54 projects, and two lateral portions 56, which extend at right angles from the cross portion 52. Each of the lateral portions 56 is mounted pivotably to one of the lateral portions 26 of the horn 20, via a pivot pin 60, whereby the bracket 50 is pivotable downwardly to an inoperative position and upwardly to an operative position.

Figure 3:
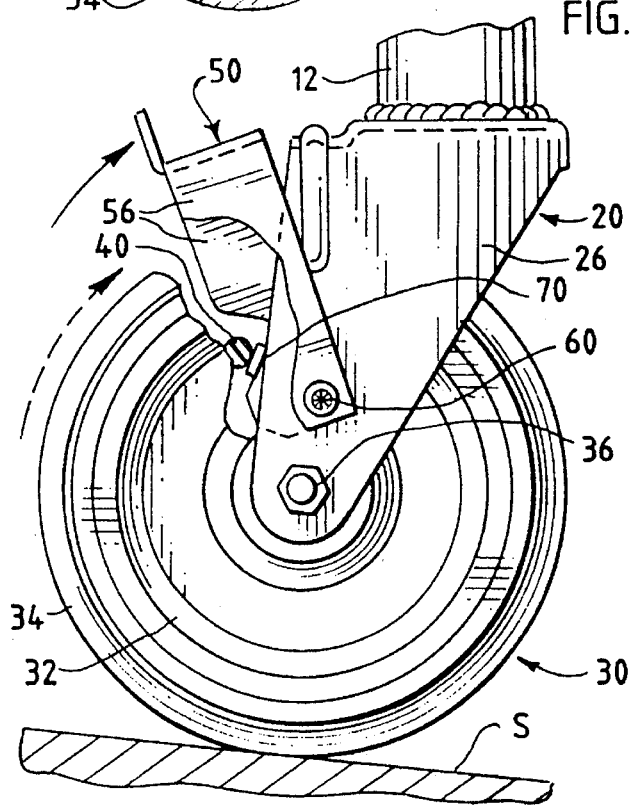
FIG. 3, on a similar scale, is a partly broken away, side elevational view of the wheel and brake assembly in a braking condition and on a sloping surface.

Moreover, the bracket 50 is formed with a tang 70 projecting axially from whichever lateral portion 56 of the bracket 50 is nearer to the side of the hub 32 where the pin 40 projects, toward the farther portion 56 of the bracket 50. Thus, as shown in FIG. 3, the tang 70 is arranged to engage the nearer portion 26 of the horn 20 at an upper location on the nearer portion 26 so as to limit pivoting of the bracket 50 into the operative position. Also, as shown in FIG. 4, the tang 70 is arranged to engage the nearer portion 26 of the horn 20 at a lower location on the nearer portion 26 so as to limit pivoting of the bracket 50 into the inoperative position.

Figure 2:
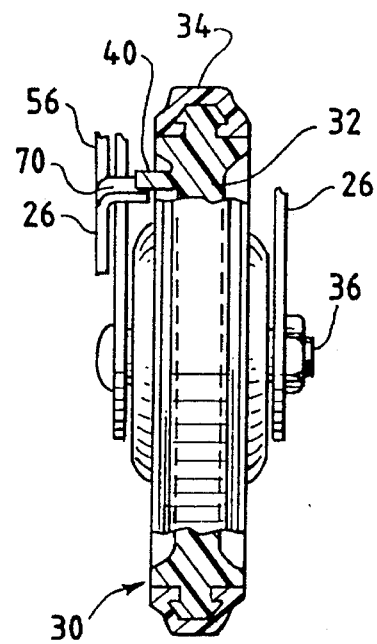
FIG. 2, on a smaller scale, is a back elevational view of the wheel and brake assembly in a braking condition.

As shown in FIG. 3, in which the wheel is shown on a sloping surface S, the braking and releasing means of the wheel and brake assembly 10 can be easily engaged so as to prevent the cart from rolling downwardly after less than one full revolution of the wheel 30. It is necessary for a user merely to lift the flange 54 with the toe of his or her shoe so as to pivot the bracket 50 upwardly to the operative position. Thus, as shown in FIGS. 1, 2, and 3, the tang 70 is arranged to engage the pin 40 so as to brake the wheel 30 against further rotation in one rotational sense, once the bracket 50 has been pivoted to the operative position, if the wheel 30 is rotated by less than one full revolution in the same rotational sense, which is clockwise in FIG. 3.

Figure 4:
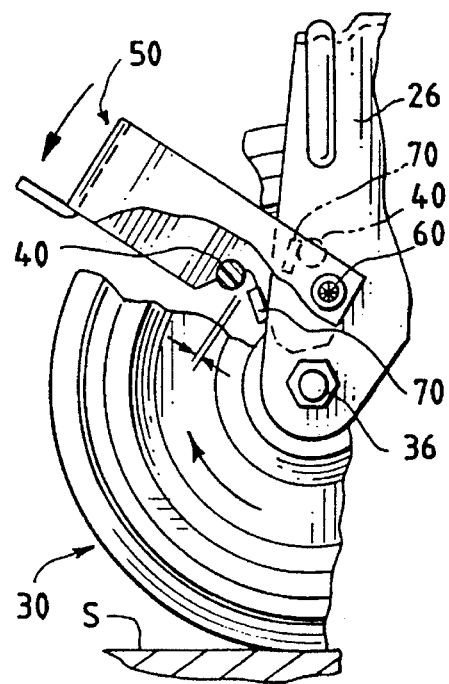
FIG. 4, on a similar scale, is a view similar to FIG. 3 but of the wheel and brake assembly in a released condition and on a level surface.

As shown in FIG. 4, in which the wheel 30 is shown on a level surface S, the braking and releasing means of the wheel and brake assembly 10 can be easily disengaged so as to release the wheel 30 after less than one full revolution of the wheel 30. The pin 40 is arranged to engage the tang 70 so as to pivot the bracket 50 from the operative position, and so as to release the wheel 30, if the wheel 30 is rotated by less than one full revolution in the opposite rotational sense, which is counterclockwise in FIG. 4. The tang 70 is arranged to pass between the pivot axis and the pin 40, once the bracket 50 has been pivoted to the inoperative position, if the wheel 30 is rotated in either rotational sense. In an alternative, less desirable mode of operation, a user can disengage the braking and releasing means by stepping on the flange 54 with the toe of his or her shoe so as to pivot the bracket 50 downwardly to the inoperative position.

Various modifications may be made in the preferred embodiment described above without departing from the scope and spirit of this invention.

I claim:

1. A wheeled cart comprising a wheel and brake assembly, said assembly including (a) a horn mounted to the cart so as to extend downwardly from the cart, (b) a wheel defining a wheel axis and including a hub, the wheel being journalled to the horn at the hub for rotation about the wheel axis, a pin projecting from the hub but clearing the horn when the wheel is rotated, and (c) a bracket mounted pivotally to the horn so as to be pivotable over a limited range, between an inoperative position and an operative position, a tang projecting axially from the bracket, the tang being arranged to engage the pin so as to brake the wheel against further rotation in one rotational sense, once the bracket has been pivoted to the operative position, if the wheel is rotated by less than one full revolution in the same rotational sense, the pin being arranged to engage the tang so as to pivot the bracket from the operative position, and so as to release the wheel, if the wheel is rotated by less than one full revolution in the opposite rotational sense.

2. The wheeled cart of claim 1 wherein the bracket is mounted pivotably to the horn so as to be pivotable about a pivot axis parallel to the wheel axis and spaced by a comparatively shorter distance from the wheel axis, wherein the pin is spaced by a comparatively longer distance from the wheel axis, and wherein the tang is arranged to pass between the pivot axis and the pin, once the bracket has been pivoted to the inoperative position, if the wheel is rotated in either rotational sense.

3. The wheeled cart of claim 2 wherein the bracket is arranged to be upwardly pivotable to the operative position and to be downwardly pivotable to the inoperative position.

4. The wheeled cart of claim 3 wherein the tang is arranged to engage the horn at an upper location on the horn so as to limit pivoting of the bracket to the operative position and to engage the horn at a lower location on the horn so as to limit pivoting of the bracket to the inoperative position.

5. A wheel and brake assembly for a wheeled cart, said assembly including (a) a horn mountable to the cart so as to extend downwardly from the cart, (b) a wheel defining a wheel axis and including a hub, the wheel being journalled to the horn at the hub for rotation about the wheel axis, a pin projecting from the hub but clearing the horn when the wheel is rotated, and (c) a bracket mounted pivotably to the horn so as to be pivotable over a limited range, between an inoperative position and an operative position, a tang projecting axially from the bracket, the tang being arranged to engage the pin so as to brake the wheel against further rotation in one rotational sense, once the bracket has been pivoted to the operative position, if the wheel is rotated by less than one full revolution in the same rotational sense, the pin being arranged to engage the tang so as to pivot the bracket from the operative position, and so as to release the wheel, if the wheel is rotated by less than one full revolution in the opposite rotational sense.

6. The assembly of claim 5 wherein the bracket is mounted pivotably to the horn so as to be pivotable about a pivot axis parallel to the wheel axis and spaced by a comparatively shorter distance from the wheel axis, wherein the pin is spaced by a comparatively longer distance from the wheel axis, and wherein the tang is arranged to pass between the pivot axis and the pin, once the bracket has been pivoted to the inoperative position, if the wheel is rotated in either rotational sense.

7. The assembly of claim 6 wherein the bracket is arranged to be upwardly pivotable to the operative position and to be downwardly pivotable to the inoperative position.

8. The assembly of claim 7 wherein the tang is arranged to engage the horn at an upper location on the horn so as to limit pivoting of the bracket to the operative position and to engage the horn at a lower location on the horn so as to limit pivoting of the bracket to the inoperative position.

9. A wheeled cart comprising a wheel and brake assembly, said assembly including a horn mounted to the cart, a wheel including a hub, the wheel being journalled to the horn at the hub, and means for braking the wheel against further rotation in one rotational sense if the wheel is rotated by less than one full revolution in the same rotational sense and for releasing the wheel if the wheel is rotated by less than one full revolution in the opposite rotational sense.

10. A wheel and brake assembly for a wheeled cart, said assembly including a horn, a wheel including a hub, the wheel being journalled to the horn at the hub, and means for braking the wheel against further rotation in one rotational sense if the wheel is rotated by less than one full revolution in the same rotational sense and for releasing the wheel if the wheel is rotated by less than one full revolution in the opposite rotational sense.

* * * * *